(12) United States Patent
Adhvaryu et al.

(10) Patent No.: US 11,836,333 B2
(45) Date of Patent: Dec. 5, 2023

(54) COMPUTER-IMPLEMENTED METHOD AND SDK FOR RAPID RENDERING OF OBJECT-ORIENTED ENVIRONMENTS WITH ENHANCED INTERACTION

(71) Applicant: M & M Info-Tech Limited, Wembley (GB)

(72) Inventors: Mukesh Arvindbhai Adhvaryu, Wembley (GB); Manan Adhvaryu, Wembley (GB); Martin George Cradley Balchin, Wembley (GB)

(73) Assignee: M & M Info-Tech Limited, Wembley (GB)

( * ) Notice: Subject to any disclaimer, the term of this patent is extended or adjusted under 35 U.S.C. 154(b) by 122 days.

(21) Appl. No.: 17/723,307

(22) Filed: Apr. 18, 2022

(65) Prior Publication Data
US 2022/0334707 A1    Oct. 20, 2022

(30) Foreign Application Priority Data

Apr. 19, 2021 (GB) ........................................ 2105599
Apr. 14, 2022 (GB) ........................................ 2205554

(51) Int. Cl.
*G06F 3/04842* (2022.01)
*G06F 3/0481* (2022.01)
(Continued)

(52) U.S. Cl.
CPC ........ *G06F 3/04842* (2013.01); *G06F 3/0481* (2013.01); *G06T 1/60* (2013.01);
(Continued)

(58) Field of Classification Search
CPC . G06F 3/04842; G06F 3/0481; G06V 10/945; G06T 1/60; G06T 11/00; G06T 2200/24
See application file for complete search history.

(56) References Cited

U.S. PATENT DOCUMENTS 5,877,762 A    3/1999   Young
6,646,639 B1   11/2003   Greene et al.
(Continued)

FOREIGN PATENT DOCUMENTS

WO    2006091111 A1    8/2006

OTHER PUBLICATIONS

Andriy Gelman et al., Multiview Image Compression Using a Layer-Based Representation, Sep. 1, 2010, IEEE 17th International Conference on Image Processing, p. 493-496 (Year: 2010).*

(Continued)

*Primary Examiner* — Tam T Tran
(74) *Attorney, Agent, or Firm* — Penilla IP, APC (57) ABSTRACT

A method of rendering an interface of an object-oriented environment is described. The method includes operations of allocating a buffer in memory for storing interface image data. The buffer provides a data structure defining a quantised image space for visible object image data. The method includes generating a set of multiple objects within the environment. Each object is associated with a layer representing the depth of the object within the environment. The layer is one of an ordered set of layers ranging from a foreground layer to a background layer. The method further includes maintaining the set of objects, in response to receiving a user input. The method includes iteratively updating the buffer to create image data, by incrementally selecting each one of the multiple layers in turn, as the current layer, from the set of layers. The method includes outputting the buffer containing interface image data.

21 Claims, 6 Drawing Sheets

(51) Int. Cl.
*G06V 10/94* (2022.01)
*G06T 1/60* (2006.01)
*G06T 11/00* (2006.01)

(52) U.S. Cl.
CPC ............ *G06T 11/00* (2013.01); *G06V 10/945* (2022.01); *G06T 2200/24* (2013.01)

(56) References Cited

U.S. PATENT DOCUMENTS

| | | | |
|---|---|---|---|
| 8,665,283 B1* | 3/2014 | Lim | G06T 1/60 |
| | | | 711/149 |
| 2009/0187529 A1 | 7/2009 | Regelous et al. | |
| 2013/0241938 A1 | 9/2013 | Gruber et al. | |
| 2014/0035942 A1* | 2/2014 | Yun | G06F 1/1637 |
| | | | 345/592 |
| 2022/0028360 A1* | 1/2022 | Özdemír | G09G 5/397 |
| 2023/0186575 A1* | 6/2023 | Turner | G06T 19/006 |
| | | | 345/419 |

OTHER PUBLICATIONS

Megumi Isogai et al., A Panoramic Video Rendering System Using a Probability Mapping Method, Jun. 1, 2011, IEEE 15th International Symposium on Consumer Electronics, pp. 1-4 (Year: 2011).*
GB2105599.1, UKIPO Search Report under Section 17, Claims 1-19 and 22 search, dated Oct. 11, 2021.

* cited by examiner

COMPUTER-IMPLEMENTED METHOD AND SDK FOR RAPID RENDERING OF OBJECT-ORIENTED ENVIRONMENTS WITH ENHANCED INTERACTION

CLAIM OF PRIORITY

This application claims priority, under 35 U.S.C. §§ 119(a)&(b), to Great Britain Patent Application No. GB2105599.1, filed on Apr. 19, 2021, which is incorporated by reference herein in its entirety.

This application claims priority, under 35 U.S.C. §§ 119(a)&(b), to Great Britain Patent Application No. GB2205554.5, filed on Apr. 14, 2022, which is incorporated by reference herein in its entirety.

FIELD

This invention relates to a device, a computer-implemented method, and to a computer program product, for rendering an interface. The invention relates particularly, but not exclusively, to rendering a graphical user interface (GUI) of an application, of an operating system (OS), or of a device, for example.

BACKGROUND

It is known for an OS such as the popular Windows™, iOS™, and Linux operating systems to provide a GUI, displayed to a user via a display device, to allow the user to interact with applications running within the OS. The OS typically associates running applications with a window, with which the user interacts, for displaying information to the user and receiving input from the user via hardware associated with the OS. Such input devices include a mouse, a keyboard, a trackball, a joystick, a touch screen device, and other suitable devices as known in the art.

SUMMARY

Operating systems like Windows™ have been built on old infrastructure dating back to the 1980s and earlier. Back in the 1980s screen resolutions were 800×600, colour resolutions were low and there were few applications running simultaneously. The foundations for GUI technologies were built for this undemanding environment. This has led to systems and methods of rendering the output from multiple applications, in multitasking environments, in a way that is antiquated for the UHD screen sizes that are now used. Developers are often forced to use messy work-arounds to cope with performance problems that arise from using systems arising from this old technology. This leads to code-bases that are hard to understand, and which incur high maintenance costs as a result. It also leads to interfaces that cannot live up to user expectations. To rectify this, expensive hardware is often needed simply to keep the screen refreshed at a sufficient rate. All this underperforming technology leads to wasted resources.

Historically, systems such as MS-DOS ran applications in such a way that the application assumed it was the only process writing to the video memory, and so the application would output data directly to be rendered. Following the introduction of early OS employing windows handling applications, a core OS component such as the graphics device interface (GDI) of a Windows™ system, for example, would handle the rendering of basic graphical objects. GDI handled drawing graphical objects such as handling rendering of lines, fonts and colour palettes.

A window typically defines an area of the displayed screen area (i.e. an area delimited on a display device) associated with that application, such that a user can highlight an application, focussing the user inputs on that window, in order that a user may interact with it. In this way, a user may choose an object by selecting it with a mouse pointer, for example, and subsequently interact with the application via that window interface. Typically, user inputs received via the input devices are then associated with inputs to that software running in relation to the selected window.

In modern systems the OS itself provides an interface which receives inputs from the user via objects within the OS interface. The OS GUI may itself be viewed as (and treated as) a single large window spanning the entire display device, within which the other application windows are contained.

When an application runs within a window, one or more window objects may be embedded within that window, which are handled by the OS as a single interactive object. In this way a media application may provide a header, an application menu for controlling the media player, an interactive menu of media content accessible via the media player, and a display area for displaying video content, for example. These objects are treated as a single entity within the OS, so that the window can be manipulated by the user to move the window's designated display area within the OS display area, or to choose options from the menu to play videos within the content display, to maximise the window to display the video across the entire display device, or to minimise it so that a user can instead interact with other applications within the OS.

An OS typically handles multiple windows within its GUI, each defining a set of associated objects to be handled within the window. In many modern OS, the OS runs a windows manager (such as Desktop Windows Manager) which coordinates operation of the various software applications running within the OS, and displays appropriate content to the user via the respective windows. Each program is allocated a buffer to which data is written. The OS then constructs an image from the data in the respective buffers, to be rendered, and output via the display device. In older OS, by comparison, a single buffer was provided to which each application would write its data. The OS rendering software constructs the composite image to be displayed from the one or more buffers of data.

The windows manager typically sends data from the buffer or multiple buffers to the graphics processing unit (GPU) of the device, which then constructs the composite image from the communicated buffered data and renders the image to the display device(s). An image handling interface such as DirectX, Vulkan, OpenGL, or another suitable API for handling rendering may be used for the process of rendering the image for output on the display device(s). Where a separate image handling interface performs the rendering process, selecting the relevant data supplied to the respective buffers by the applications associated with the windows, some of the processing burden is removed from the central processing unit (CPU) and transferred to the GPU, for example. However, the applications continue to generate data to update the buffers, requiring CPU usage in handling these ongoing calculations to determine the image data associated with each window. This activity occurs regardless of the subsequent selection and composition of image data rendered to the display device. In other words, a window that is running an application and is not 'minimised' within the OS, continues to write data to the buffer which is then referenced by the windows manager, and sent to the GPU to construct the image to be output to the display. Where a window is obscured partially or entirely by another window located 'in front' of it, the data is still computed and written to the buffer, and the determination of the data to be output via the display is made at a later stage of the processing pipeline.

The complexity of windows within an OS and the volume of calculations required to determine the data to be buffered, and to determine a composite image for rendering to a display device based on the buffered data, means that the improvements achieved in terms of usability of the systems, and smoothness of the graphical output of the systems, is offset to some degree by the speed of the rendering system. This resource-intensive approach has been followed and developed substantially over multiple iterations of OS across many different platforms over the past three decades, during which time computation power has become much more cost effective. So, in this way, system developers have concentrated on enhancing the graphical appearance of modern interfaces while supporting the increased complexity and processing requirement by using devices with increased computational processing power. The speed of computational processing and the ability to scale to large volumes on small devices has meant that developers have no need to consider less computationally expensive techniques since for many purposes the computational speed was adequate for the majority of rendering tasks.

However, it would be advantageous to improve rendering speeds of applications, systems and devices. It would also be beneficial to decrease the processing requirements of such applications, systems, and devices, since increasing processing requirements leads to increased energy usage which consequently comes with an environmental impact.

The present invention seeks to reduce or overcome one or more of the deficiencies associated with the prior art. The present invention provides a mechanism for rendering an interface, and interacting with an interface, that is more efficient in terms of its computational demands on a processor, and is therefore more energy efficient, and more environmentally friendly as a result.

According to an aspect of the invention, we provide a computer-implemented method of rendering an interface of an object-oriented environment, including the steps of:
  allocating a buffer in memory for storing interface image data, the buffer providing a data structure defining a quantised image space for visible object image data;
  generating a set of multiple objects within the environment, each object being associated with a layer representing the depth of the object within the environment, the layer being one of an ordered set of layers ranging from a foreground layer to a background layer;
  maintaining the set of objects, in response to receiving a user input, by performing at least one of: adding or removing an object, adding or removing a layer and any object associated with the layer, changing the layer associated with an object, or changing the order of the layers;
  iteratively updating the buffer to create image data, by incrementally selecting each one of the multiple layers in turn, as the current layer, from the set of layers, starting with the foreground layer and ending with the background layer, and, for each object associated with the current layer:
  determining object image data representing the space the object occupies within the interface,
  comparing the object image data to the interface image data stored in the buffer,
  determining visible object image data from the object image data, in which portions of the object image data that are obscured by one or more objects in a previous layer are excluded from the visible object image data, and updating the interface image data stored in the buffer by rendering the visible object image data; and
  outputting the buffer containing interface image data.

Generating buffered interface image data in this way, by processing layers of the interface and the objects associated with those layers in a 'front to back' ordering, rather than a traditional 'back to front' process, means that there is no duplication in writing data to the buffer in each update cycle. Data is written to the foreground first, and subsequently 'filled in' behind the foreground layer. This removes the usual overwriting of foreground data over background data after the background data has been written.

It should be noted that the method involves only front to back processing of the layers and objects. In other words, consecutive iterations of processing each involve processing the layers from front to back, with no intermittent steps of 'back to front' processing. So the final step of iteratively updating the buffer by incrementally selecting a current layer from the set of layers, starting with the foreground layer and ending with the background layer, involves rendering the visible area of each object.

The quantised image space defined in the interface image data may represent a 2D image, a stereoscopic 3D image, or image data for rendering a 3D environment or an augmented reality environment, and outputting the interface image data may include outputting the interface image data to a display device, or may include outputting the interface image data to a compositing window manager to be rendered within an interface of an operating system.

Providing a single buffer of data representing the multi-object environment means that it can be directly output with no compositing required, whether the environment is the only software running within an OS, or is running at OS level on a device.

Outputting the interface image data may include writing the image data to a memory or storage device, or streaming the data over a connection to a remote device.

Updating the interface image data stored in the buffer may further include storing, for each quantised unit of the interface image data, an associated object identifier corresponding to the object.

Comparing the object image data to the interface image data stored in the buffer may include:
  determining one or more overlapping quantised units;
  identifying, for the or each overlapping quantised unit, the object associated with the quantised unit stored in the interface image data using the stored object identifier; and
  if the layer of the identified object is nearer to the foreground than the layer of the current object, excluding the or each quantised unit from the visible object image data.

Storing identifiers of the objects means that the interface can determine the depth of each quantised unit stored—in terms of where it lies between the foreground and background of the interface. In this way, the process can determine whether to overwrite the data with new image data for objects closer to the foreground, or whether a newly processed object lies behind the current image data— to the background of the interface.

The method may include performing an action on the identified object, wherein the action is one of:
- changing the layer associated with the identified object, either permanently or temporarily;
- generating a new object associated with the identified object for displaying data about the selected object;
- selecting the object as the focus for further user input;
- temporarily removing one or more foreground layers from the iterative updating of the buffer while the object is selected, so that the layer associated with the selected object is in the frontmost displayed layer of the interface.

Updating the buffer for each object associated with the current layer may involve processing each object in an order determined by priority values associated with the respective objects.

According to a second aspect of the invention, we provide a computer-implemented method of identifying an object within an interface of an object-oriented environment rendered by the method of the first aspect of the invention, in which an associated object identifiers are stored, further including:
- receiving from a user a selection of a position within the interface, and
- identifying the object displayed at the selected position within the interface.

Identifying the object displayed at the selected position within the interface may include:
- identifying the quantised unit within the quantised image space at the selected position within the interface image data stored in the buffer, and
- identifying the object associated with the selected position using the stored object identifier associated with that quantised unit in the data stored in the buffer.

Storing identifiers of the objects associated with the output image also creates a directness of interaction between a user and the objects running within the interface. As a result, a user may select or otherwise interact with any visible object within the interface rather than being limited to interacting with foreground objects as is the case in prior art interfaces.

According to a third aspect of the invention, we provide A computing device including a memory and a processor, the computing device being configured to render an interface of an object-oriented environment, wherein:
- the memory provides a buffer for storing interface image data defining a quantised image space for visible object image data;
- the processor being configured to:
- generate a set of objects within the environment, each object being associated with a layer representing the depth of the object within the environment, the layer being one of an ordered set of layers ranging from a foreground layer to a background layer;
- maintain the set of objects, in response to receiving a user input, by performing at least one of: adding or removing an object, adding or removing a layer and any object associated with the layer, changing the layer associated with an object, or changing the order of the layers;
- iteratively update the buffer to create image data, by incrementally selecting each one of the multiple layers in turn, as the current layer, from the set of layers, starting with the foreground layer and ending with the background layer, and, for each object associated with the current layer:
  - to determine object image data representing the space the object occupies within the interface,
  - to compare the object image data to the interface image data stored in the buffer,
  - to determine visible object image data from the object image data, in which portions of the object image data that are obscured by one or more objects in a previous layer are excluded from the visible object image data, and
  - to update the interface image data stored in the buffer by rendering the visible object image data; and
- output the buffer containing interface image data.

The quantised image space defined in the interface image data may be compatible with the resolution of an associated display device, and the device outputting the interface image data to the display device.

The interface image data may be output to a compositing window manager of an operating system running on the device to be rendered on a display device within an interface of the operating system.

The memory may further store for each quantised unit of the interface image data, an associated object identifier corresponding to the object.

The processor may be further configured to compare the object image data to the interface image data stored in the buffer includes by:
- determining one or more overlapping quantised units;
- identifying, for the or each overlapping quantised unit, the object associated with the quantised unit stored in the interface image data using the stored object identifier; and
- if the layer of the identified object is nearer to the foreground than the layer of the current object, excluding the or each quantised unit from the visible object image data.

The device may be further configured to:
- receive a user input corresponding to a selection of a position within the interface, and
- identify the object displayed at the selected position within the interface.

The processor may be further configured to:
- identify the quantised unit within the quantised image space at the selected position within the interface image data stored in the buffer, and
- identify the object associated with the selected position using the stored object identifier associated with that quantised unit in the data stored in the buffer.

The processor may be further configured to perform an action on the identified object, wherein the action is one of:
- changing the layer associated with the identified object, either permanently or temporarily;
- generating a new object associated with the identified object for displaying data about the selected object;
- selecting the object as the focus for further user input;
- temporarily removing one or more foreground layers from the iterative updating of the buffer while the object is selected, so that the layer associated with the selected object is in the frontmost displayed layer of the interface.

Updating the buffer for each object associated with the current layer may involve processing each object in an order determined by priority values associated with the respective objects.

According to a fourth aspect of the invention, we provide a computer-implemented method of identifying an object within an interface of an object-oriented environment, including the steps of:

generating multiple objects within the environment, each object being associated with a layer representing the depth of the object within the environment;

storing interface image data in a buffer in memory, the interface image data providing a data structure defining a quantised image space for output to a display device, each quantised unit of the interface image data having an associated object identifier corresponding to one of the objects;

receiving from a user a selection of a position within the interface, identifying the quantised unit within the quantised image space at the selected position within the interface image data stored in the buffer, and identifying the object associated with the selected position using the stored object identifier associated with the identified quantised unit.

According to a fifth aspect of the invention, we provide a computing device including a memory and a processor, and the computing device being configured to receive a user input, and to identify an object within an interface of an object-oriented environment based on the user input, wherein:

the processor is configured to generate multiple objects within the environment, the memory provides a buffer for storing interface image data, the interface image data providing a data structure defining a quantised image space, and storing for each quantised unit of the interface image data an object identifier corresponding to one of the objects;

the processor being further configured to:

receive a user input corresponding to a selection of a position within the interface, identify the quantised unit within the quantised image space at the selected position within the interface image data stored in the buffer, and identify the object associated with the selected position using the stored object identifier associated with the identified quantised unit.

According to a sixth aspect of the invention, we provide a computer program product comprising instructions to cause a computing device to carry out the steps of the method of the first, second or fourth aspects of the invention.

BRIEF DESCRIPTION OF THE DRAWINGS

Embodiments of the technology will now be described, by way of example only, with reference to the following figures.

DETAILED DESCRIPTION

Figure 1:
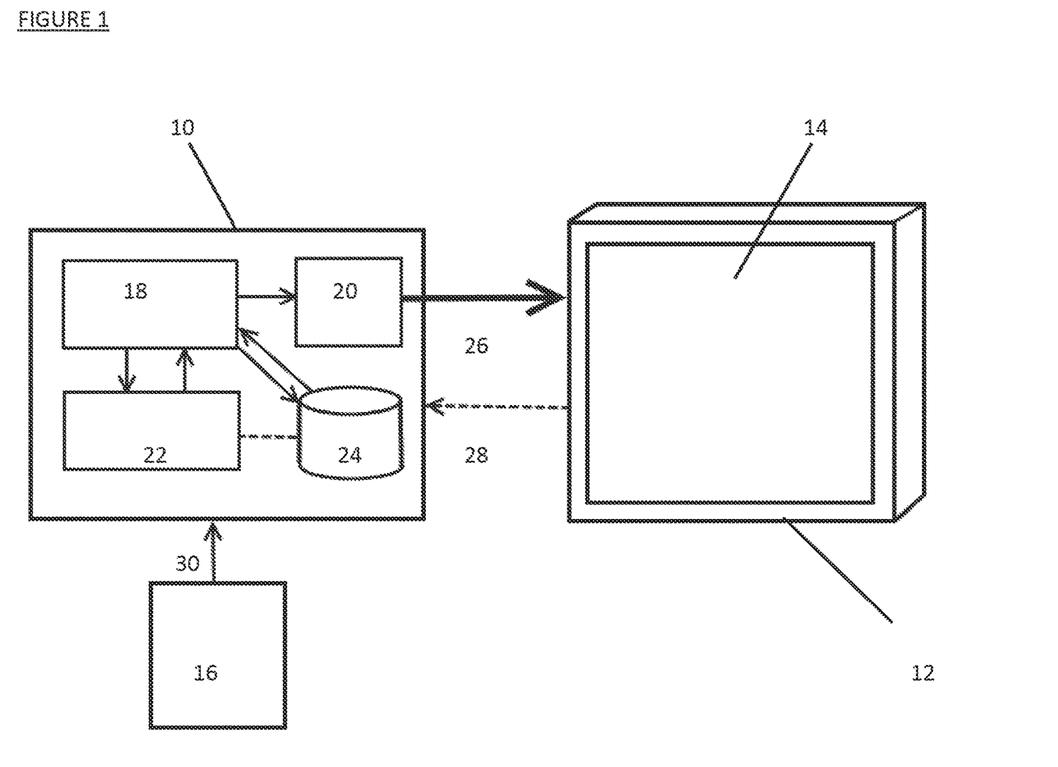
FIG. 1 is a diagram illustrating an example layout of system incorporating a device according to embodiments of the technology.

The present invention provides a virtual control environment, which is an object-oriented environment, configured to run on a computing device 10. The computing device 10 may be any suitable device having a memory 22 and processor 18, and having an output 26 for rendering an interface on a display device 12 providing a visual display 14 for displaying an interface. The computing device 10 may include a storage device 24, and a graphical processing unit 20. In embodiments of the technology, a user input device 16 is provided for allowing a user to control and interact with the computing device 10, sending control signals 30 to be received by the device. It should be understood that references to storing data in memory may, in embodiments, instead or in addition involve writing the data to the storage device.

In embodiments, the virtual control environment functions as a software development kit (SDK), and a development environment for use in creating software/hardware interfaces. While the technology is described primarily in relation to a SDK enabling production of new software having the advantages described, the SDK also allows development of OS software; designed to run as a primary OS of a device. Furthermore, the SDK enables production of OS-level software which operates outside of a traditional OS; effectively allowing software developed within the environment to circumvent the standard operation of the OS in which it is operating. In this way, the software avoids incurring the processing overheads associated with standard OS object-driven system design.

The computing device may be a desktop PC, a laptop, or a workstation for example. Such devices are suitable for operating the virtual control environment for the purpose of developing software applications, for example. In other embodiments the display device 12 may be a standalone monitor or a display screen forming a part of the computing device 10 itself. In embodiments of the technology, the display device 12 may provide an integral user input device via a touchscreen technology for example. In such cases, user input 28 are provided to the computing device 10 from the display device.

In embodiments of the technology, the virtual control environment is instantiated as single object within the existing OS in which it runs—which could be any graphical operating system (such as Windows™, iOS™, or Linux, or may alternatively be an OS specific to wearable-technology or for an industrial control system, for example). The virtual control environment acts as a single object, and so is instantiated as a single "window" within a windows-based OS. That window within the OS has an associated buffer in memory 22 to which image data is written, and the virtual control process therefore writes its image output data to that buffer. The memory storing the buffer may be system memory 22 or video memory forming a component of a GPU 20. The location of the buffer is dependent on specific implementations and may be determined by system architecture, and is most commonly determined by the underlying OS; either way its location and implementation is not critical to performing the invention.

In this setting, the virtual control environment may provide multiple working 'desktop' environments, each defining a separate interface. In such cases, a separate buffer may be used to store data relating to each of the interfaces (each potentially containing displays of different subsets of the objects in the environment, for example), such that the buffer relating to the currently displayed interface is rendered at any point. To switch between working desktops, the display output is switched to a different corresponding one of the buffers. Any standard "virtual view" in implements a concept of paging, storing data relating to multiple pages or desktops, each having a separate object collection associated with it, which means a user can create virtual pages and add objects on those pages separately, allowing a user to select between which page or pages of objects to be displayed.

The virtual control environment effectively takes over operation of the device, operating as though it is an OS within the existing primary OS, so as to act as a platform on which other applications may run. In embodiments, the virtual control environment receives user input(s) 30 of control signals via the input devices 16 associated with the computer 10. This may be achieved when a window associated with the virtual control environment is in focus within the primary OS, or may override receipt of input control by the primary OS, while the virtual control environment is operational.

Where the virtual control environment operates as an application within an OS, the image data stored in the buffer, associated with the virtual control, is output from the computing device to the display device(s) in line with standard operation of the OS. Due to the fact that only a single buffer is used to represent the image data relating to multiple entities (i.e. applications, objects and/or windows) running within the virtual control environment, a significant saving is made in terms of the buffer size required to store the image data associated with those multiple entities.

For example, if the same number of entities was running within the primary OS rather than via the virtual control environment, each would have an associated buffer assigned to it—scaling the memory use directly according to the number of entities involved. In addition, the windows manager and/or image handling interface would need to carry out a large amount of additional processing to combine the image data stored in the multiple buffers, in order to form a composite image representing the entities that are visible for output to the display. Instead, the virtual control environment removes this processing from the OS, window manager and image handling interface, taking away the processing burden from the CPU and/or GPU processor.

Furthermore, a significant reduction in processing is achieved due to the fact that the image data is provided as a simple complete set which can be displayed directly with minimal or no further processing (depending on the way in which the image data is stored and output). For example, in its simplest form, the buffer may store image data representing a raster image or bitmap, effectively which can be displayed with little or no processing. There is no need for the processor 18 or GPU 20 to determine window ordering, obscurement of one or more portions of windows due to overlap, or any graphical effects applied to the windows such as partial transparency or the like.

In this way, when many objects are instantiated within the virtual control environment, a very significant rendering speed increase can be achieved when compared to visualising the same number of identical objects in an existing OS.

Since all objects within the virtual control environment output image data to a single buffer, in a raster format that is suitable for direct output, the virtual control environment is not OS-specific. Any OS that has the capability to output image data from a buffer in the standard manner, as known in the art, can host the virtual control environment. This means that it can run alongside any existing OS as a single application within the OS. Alternatively, it may run directly at an OS-level, bootable directly on device start-up, to provide a graphical interface for one or more applications. For example, the virtual control environment may operate as the primary OS on a device.

Applications within the virtual control environment can run faster than they would operate in an existing OS, using even a resource-sensitive device such as a tablet computer or a moderate size mobile phone for example. The applications developed within the virtual control environment can be made comparatively very lightweight in terms of the memory and processing usage required, so as to be deployable on target lightweight devices without heavy processing resources. This makes applications developed using the virtual control environment ideal for use on wearable devices, for example, or to run on lightweight devices such as smartphones.

The virtual control environment enables software developers to require far lower processing resources to develop complex software. At present, it is normal practice for software development studios to buy virtual private servers or resort to using cloud processing to allow them to design applications involving large numbers of complex entities, due to the processing power required to render the output. This is particularly true for example in game development studios and in film studios—particularly in the case of advanced visual effects development. Where large processing overheads are required to render images due to the complex overlaying of entities, the same output result can be rendered from a virtual control environment in a much less computationally expensive manner.

It has been found that a comparative test of creating multiple entities within the virtual control environment achieved a 735% relative performance increase in terms of speed of entity creation and handling within the environment, compared to creating those same entities within an existing SDK running outside of the virtual control environment on the same device. Furthermore, a relative speed increase of 2323% was achieved in performing a task of rendering animated entities within the virtual control environment when compared to rendering the same animated entities using an existing SDK running outside of the virtual control environment, on the same device.

While the virtual control environment and its interface are described herein in relation to use of a single buffer to hold the interface image data and in order to render the objects within the environment, it should be understood that the output rendered interface may be formed by combining data from a background buffer (comprising background images drawn as a background of desktop), a foreground buffer (comprising interactive objects such as super-imposed images, shapes, and user-controls), and a virtual window buffer. It is the virtual window buffer that is described herein as the buffer storing interface image data, rendering the objects within the interface.

In embodiments of the technology, the interface image data generated to the buffer according to the methods described herein, may be written to the buffer following submission of a background layer from a separate background buffer and a foreground layer (containing overlying menus or tool tips, for example) from a separate foreground buffer. The object image data is subsequently determined according to the methods outlined, and written to the buffer 'in front' of the background image data, and 'around' the foreground data. In effect, this corresponds to use of a background and a foreground layer for rendering the interface image data as outlined herein.

In more detail, and with reference to FIGS. 2-7 of the drawings, a computer-implemented method of rendering an interface 40 of an object-oriented environment is described. A buffer is allocated in memory 22 (step 100), for storing interface image data, the buffer providing a data structure defining a quantised image space for storing visible image data (suitable for output to a display device 12, for example). By a quantised image space, we mean that the visible image data is stored in a quantised form (such as pixels, for example). However, the granularity of the quantisation might be finer than the visible pixel output for a display device on which it is rendered, for example. This quantisation may have a direct correspondence with the resolution of the image to be output from the device. For example, for outputting to a two dimensional display having a 1920×1200 pixels resolution, a set of 1920×1200 image data values will be stored as a rasterised image representing the pixels to be output illustrating the interface 40—either as an image to the display device 12, or to a compositing window manager incorporated in an OS on which the object-oriented environment is running. In terms of a two dimensional space, the quantised image space is effectively a rasterised image comprising a 2 dimensional array of pixels. The term image space refers to the fact that the image data may not represent a 2 dimensional image, necessarily—the quantised image space may represent image data describing a three dimensional (3D) environment, a 3D stereoscopic image, or a portion of an augmented reality environment, for example. The quantised image held as the interface image data may have a direct correlation with the pixels of a display device to which the data is to be output (i.e. it may be stored at the resolution of the display device); interface image data is at least compatible with the display device such that the device can receive the image data and process it for display.

For simplicity herein, while it should be understood that the quantised image space may represent an output other than a rasterised image (as described above), we shall use the terms "quantised unit" interchangeably with "pixel", and references to a "rasterised image" refer to a quantised image space.

Figure 8:
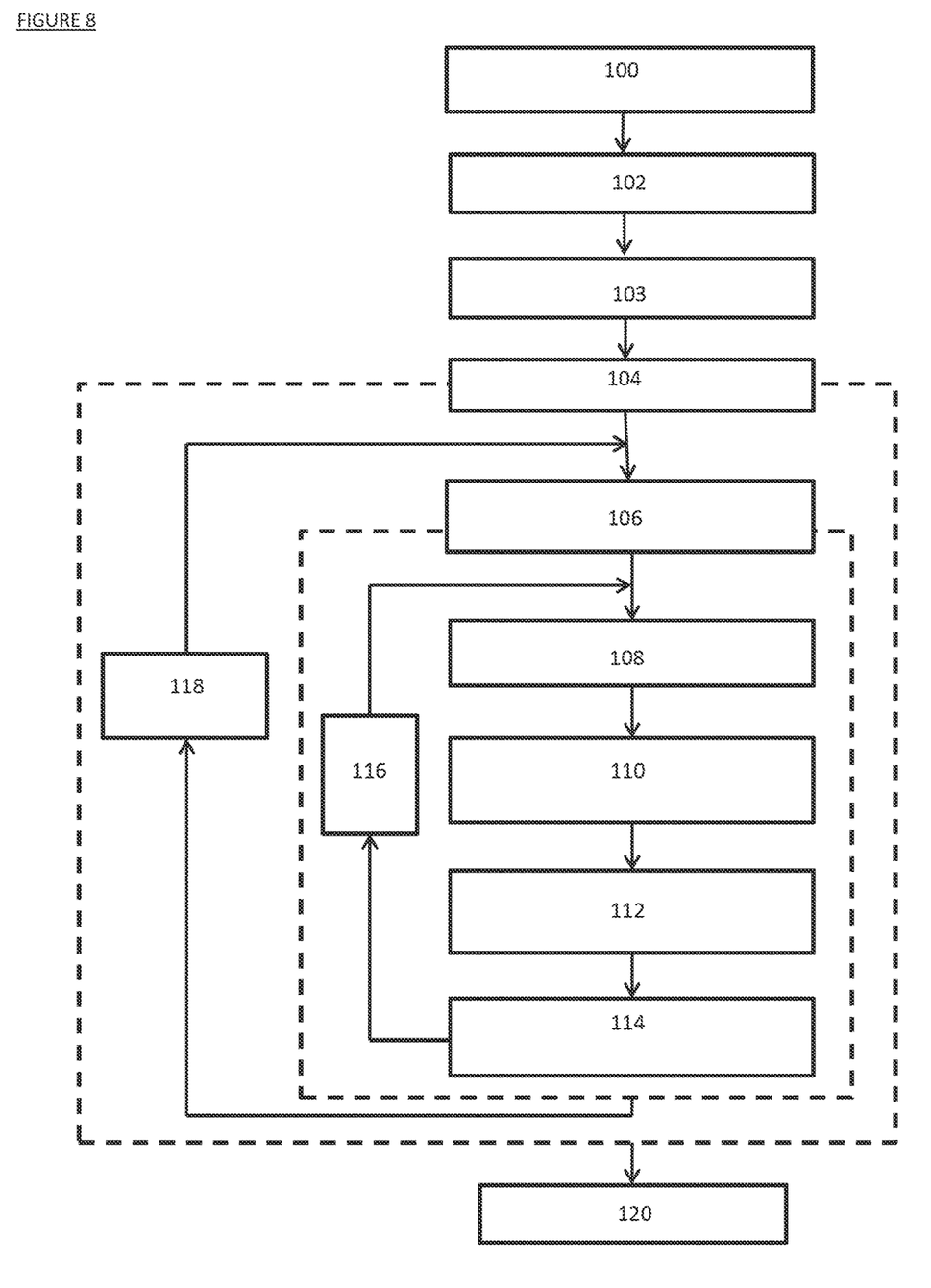
FIG. 8 is a flowchart illustrating an embodiment of a method.

Multiple objects 42, 44 are generated within the environment (step 102), each object 42, 44 being associated with a layer (L0 and L3, respectively) representing the depth of the object within the environment. The objects 42, 44 are maintained (step 103) within the environment, via user interaction (i.e., on receipt of user inputs), such that in response to receiving a user input, objects may be changed (the object may be enlarged on the display, for example), added to or removed from the set of objects, layers may be added or removed, along with any object associated with the layer, the layer associated with an object may be changed to a different layer, or the order of the layers may be changed, for example.

The object-oriented environment maintains a unique ordered set of layers ranging from a foreground layer to a background layer. It is important to note that the set of layers is a unique set and that additional copies of the layers, and object information, are not created or stored, as using the method as described, there is no requirement to hold additional data in this way in order to produce an efficient rendering of the environment. The possible exception to that is in relation to a system providing multiple-displays, in which a set of layers maybe maintained for each, in order that each display might render a differently ordered set of objects within the environment if desired. Notably, for rendering the interface on a single display, or providing a single output buffer containing interface image data, there is maintained only a single set of layers for that task.

Figure 2:
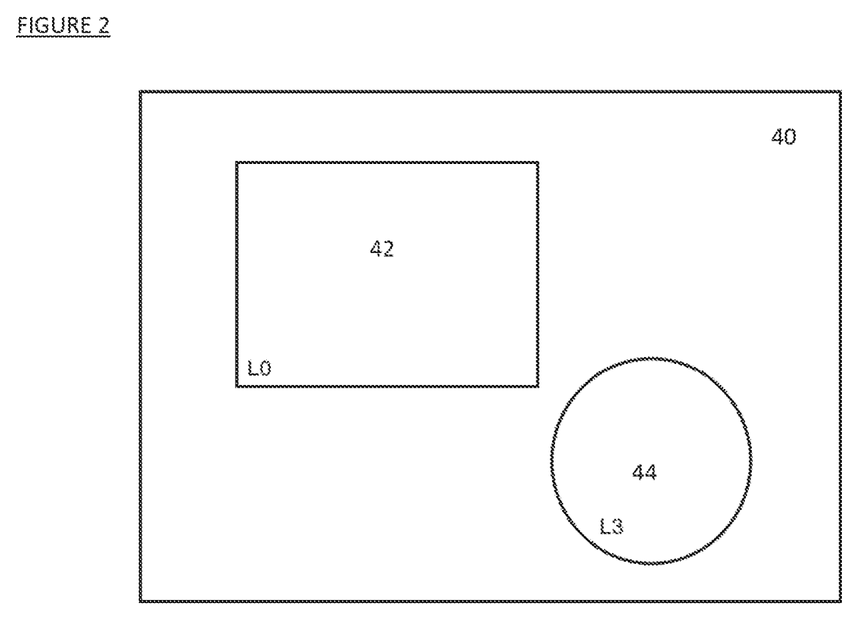
FIG. 2 is a diagram illustrating an embodiment of a displayed interface output.
Figure 3:
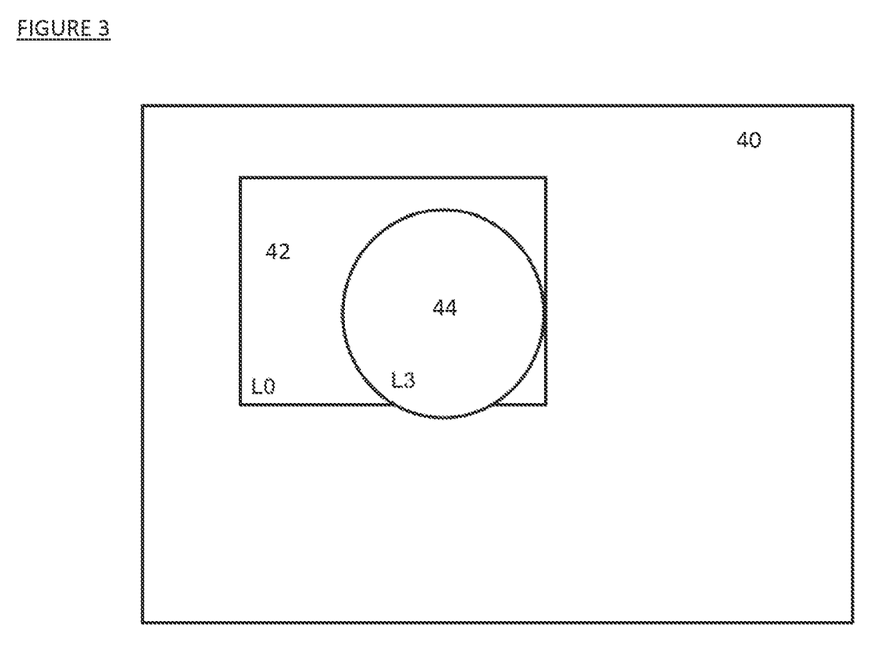
FIG. 3 is a diagram illustrating an embodiment of a displayed interface output.

In the example given here, the two objects 42, 44 illustrated in FIGS. 2 and 3 are associated with layers L0 and L3 respectively, with L0 being the 'deeper' layer (i.e. towards the background of the interface 40) and L3 being the 'closer' layer (towards the foreground of the interface 40). It can be seen in FIG. 3 that the circular object 44 appears towards the foreground, obscuring a portion of the rectangular object 42 which appears relatively towards the background of the interface 40. This is achieved by the circular object 44 being associated with layer L3, and the rectangular object being associated with layer L0. Information about each object 42, 44 is typically stored in vector form, defining the dimensions and appearance of the object 42, 44— i.e. coordinates of points defining the corners of a window, or the points and/or equations defining the geometry of a shape of the object.

In embodiments, at the start of the cycle the buffer is cleared so that no image data is retained. In more common embodiments, the buffer is maintained between cycles, as described below.

The processor 18 iteratively updates the buffer by incrementally selecting a current layer from the set of layers (step 104), starting with the foreground layer and ending with the background layer. For every layer in sequence, each object associated with that current layer is selected in turn (step 106) and processed to determine whether any part of the graphical output 26 from the interface 40 will be associated with that respective object. First, object image data representing the object 42, 44 is determined (step 108). That object image data represents how the object 42, 44 will be displayed in the interface, including the pixel-wise illustration of the object and the position of the object within the interface. For example, the object image data may be calculated based on vector information describing the object 42, 44.

The object image data is then compared to the interface image data stored in the buffer (step 110), visible object image data is determined (step 112). The visual object image data represents any portion of the object image data that will be visible in the interface 40. The interface image data is subsequently updated by storing the visible object image data in the buffer (step 114).

Once each object has been analysed in this way, another object in the layer is selected in turn, until all of the objects associated with that layer have been processed. The next layer is then processed in the same way, until all of the layers within the environment have been processed. Once the layers and objects have been processed, the interface image data is then output (step 120). The image data may be output to a display device 12 as previously described, or may involve outputting the interface image data to a compositing window manager to be rendered within an interface of an operating system.

This process of selecting every layer and every object in the environment in turn, and processing each one, provides a comprehensive approach. This differs from alternative rendering systems in which pruning occurs, such that certain objects or layers are removed from the process. A system relying on pruning techniques to achieve its efficiency typically requires the objects to be windows—having a known shape such as a rectangle—so that it can simply be established whether a foreground object obscures a deeper-lying object, thus enabling the deeper object or layer to be skipped. The present system provide a more thorough approach, which processes each and every layer, allowing for irregular shaped objects and complex objects to be rendered within the environment.

Further, a large factor in the efficiency of the present method and system over prior systems is the processing of all of the data at a single processor or processing device. By processing all of the object data on a single processing unit (i.e., a processor or multi-processor unit), rather than outsourcing various stages of the processing to different components the method achieves significant advantages in efficiency. The process may be run entirely locally on a processor. In embodiments, the processing may be carried out via a single processing unit, wherein that unit is a GPU.

Figure 4:
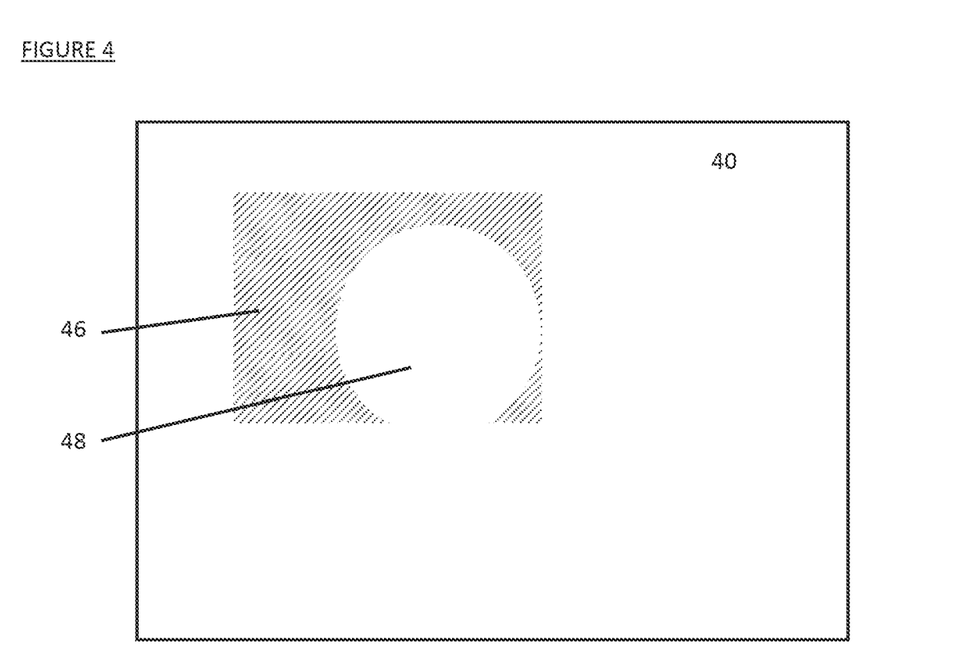
FIG. 4 is a diagram illustrating an embodiment of a displayed interface output.

For example, with reference to FIGS. 3 and 4, the circular object 44 is in layer L3, which is towards the foreground. Therefore, that circular object 44 is updated prior to rectangular object 42, which is in layer L0, in the iterative process of updating the buffer. When the circular object 44 is evaluated, since no object is in a layer nearer to the foreground than L3, and since the circle is positioned wholly within the boundary of the interface so no part overlaps the edge, the whole of the object image data associated with that object 44 is written to the interface image data in the buffer, to be displayed in the interface 40. Subsequently, when layer L0 is evaluated, and the rectangular object 42 is evaluated, the object image data determined for that object 42 is a complete rectangle—since the object lies wholly within the boundary of the interface 40. However, that object image data is then compared to the interface image data, and it is determined that there is a significant overlap between the pixels of the rectangle's object image data and many of the pixels of the circle's data which is now stored in the interface image data. The overlapping pixels are discarded, effectively, since the circle lies in front of the rectangle in the interface. The visible object image data is therefore determined to include only the pixels of the rectangle object 42 image data that do not already have a corresponding entry in the interface image data; effectively the area shown as 46 in FIG. 4 forms the visible object image data to be added to the interface image data and stored in the buffer, and the pixels indicated at region 48 of the interface 40 are excluded from the visible object image data and so are not added to the interface image data.

So, in broad terms, portions of the object image data that are obscured by one or more objects in a previous layer are excluded from the visible object image data at that stage. In other words, the process masks the object image data using the interface image data, and retains only the portions that are not obscured.

In this way the object-oriented environment is rendered from front-to-back. This differs from prior art object-oriented systems in which GUI have been rendered by determining object image data for each object, storing each in memory, and then using a compositing window manager or similar technology to construct a composite image by overlaying all of the object image data in sequential manner from the background to the foreground. In this way, in contrast to the present method, many additional steps of data writing are required in order to build up the composite layered image during each refresh cycle of the display device.

In embodiments of the technology, a background layer is assigned as a separate entity to the other layers of the interface. In such embodiments, the background layer may be treated as a static layer, which is not expected to be updated visually. The background layer may, in such embodiments, be assigned its own separate buffer which represents the default image to be output as the deepest layer of the display.

In embodiments of the technology, the generated objects are associated with layers assigned as byte values (i.e. 0-255), for example, wherein objects with higher values appear in the foreground, and those with lower values appear in the background or are obscured by objects appearing 'in front' of them in the interface. It should be understood that instead of assigning byte values, other variable values might be assigned so as to provide a different (e.g. greater) number of layers.

Figure 5:
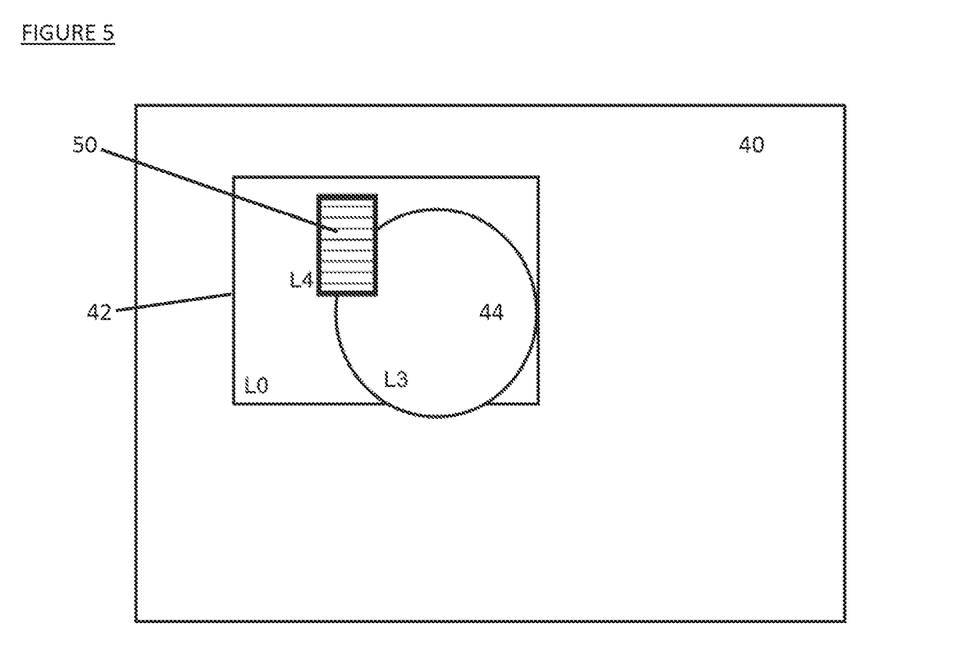
FIG. 5 is a diagram illustrating an embodiment of a displayed interface output.

Types of objects may be assigned to specific layers of the interface, so that certain common object types always appear in front of, or behind, other types of object. In an example embodiment of the environment, layer 0 is assigned to "permanent" objects within the interface, which can be manipulated by a user (such as windowed applications, or objects created within an application). Blinking or flashing graphics may be assigned to layer 1, tool-tip information boxes may be assigned to layer 2, animated objects are assigned to layer 3, and pop-up menus are assigned to layer 4. In this way, a pop-up menu 50 generated by a user is always in the foreground of the interface (as shown in FIG. 5).

Multiple objects of the same type within the interface may be assigned an ordering within a layer, dictating the order in which the objects are processed when objects are selected within a particular layer (step 106). To achieve this, each object is assigned a priority value to represent the relative ordering of objects with the layer. The updating of the buffer, for each layer, processes each object associated with the current layer in order of the priority values of those objects (e.g. from lowest to highest, or vice versa, or according to an ordering of the values stored in an array). Objects within a layer may be moved further towards the background or towards the foreground of the interface, for example, by assigning higher or lower priority values to the object so that the order in which it is processed relative to the other objects in the layer changes. In the same way that the foreground layers are processed first when updating the buffer, objects having a priority value that places them to the foreground of the objects within a layer are processed before objects having a priority that places them towards the background.

In embodiments of the technology, where the buffer is not wiped blank after each refresh of the display, the data structure storing the quantised image of the interface image data further stores, for each quantised unit (e.g. pixel) of the interface image data, an associated object identifier corresponding to the object 42, 44. In other words, the buffer stores not only the quantised image data representing the displayed interface, but a record of the object generating each of those respective image data. This means that the object-oriented environment stores data about the objects generating the displayed interface, to allow that data to be reverse-engineered, in effect.

In this way, comparing the object image data to the interface image data stored in the buffer (step 110), includes determining one or more overlapping pixels between the data sets, identifying for the or each overlapping pixel, the object associated with the quantised unit or pixel stored in the interface image data using the stored object identifier; and subsequently comparing the layer associated with the object already represent in the interface image data with the current layer. If the layer of the identified object is nearer to the foreground than the layer of the current object (or, if the objects are associated with the same layer, but the identified object has a priority value placing it nearer the foreground than the current object) then the overlapping image data is excluded from the visible object image data. So, in other words, the process determines whether the object being processed is in front of, or behind, the objects already represented in the interface image data. If the object is obscured by those other objects, then the object image data is discarded from the visible object image data in step (114). Effectively, the process draws new image data behind the existing objects in the foreground, filling in image data around the portions obscured by the foreground objects.

We also describe a computer-implemented method of identifying an object within an interface 40 of an object-oriented environment rendered by the methods described above. A user provides a selection 52, 62 of a position within the interface 40, illustrated as X in FIGS. 6 and 7, as a user input 30 via an input device 16 (such as a keyboard, mouse, touch screen interface, or any other suitable input device as is known in the art). In turn, a determination can be made of a pixel within the interface image data that is associated with selected position, using standard processes for interpreting hardware inputs. For example, it is well known how to determine the position of a mouse cursor in a user display relative to an interface, or to determine the position of a user's touch-screen interaction with an interface.

Since the buffer stores not only the interface image data but also associated object identifiers, the object displayed at the selected position within the interface is then identified. In this way, the object associated with the selected position using the stored object identifier associated with a particular pixel in the data stored in the buffer can be used to 'select' an object within the environment.

In this manner any visible object may be selected by a user via a single interaction. This is not the case in existing object-oriented environments, in which an object in the background of the interface, yet visible to a user through a transparent portion of a foreground object, cannot be selected. Instead, a user interaction on a portion of the interface within the boundary of the foreground object would select that frontmost object. To access or select a background object, the user would need to reposition the frontmost object so as to provide an unobscured path to the rearmost object, or minimise the frontmost object so it disappears from view, for example.

Figure 6:
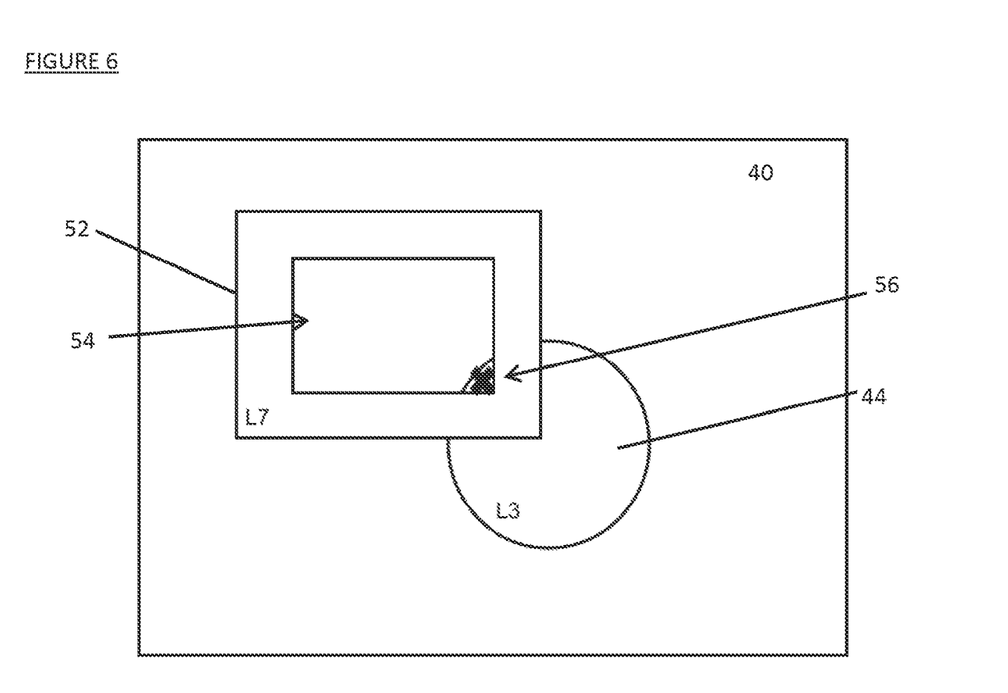
FIG. 6 is a diagram illustrating an embodiment of a displayed interface output.
Figure 7:
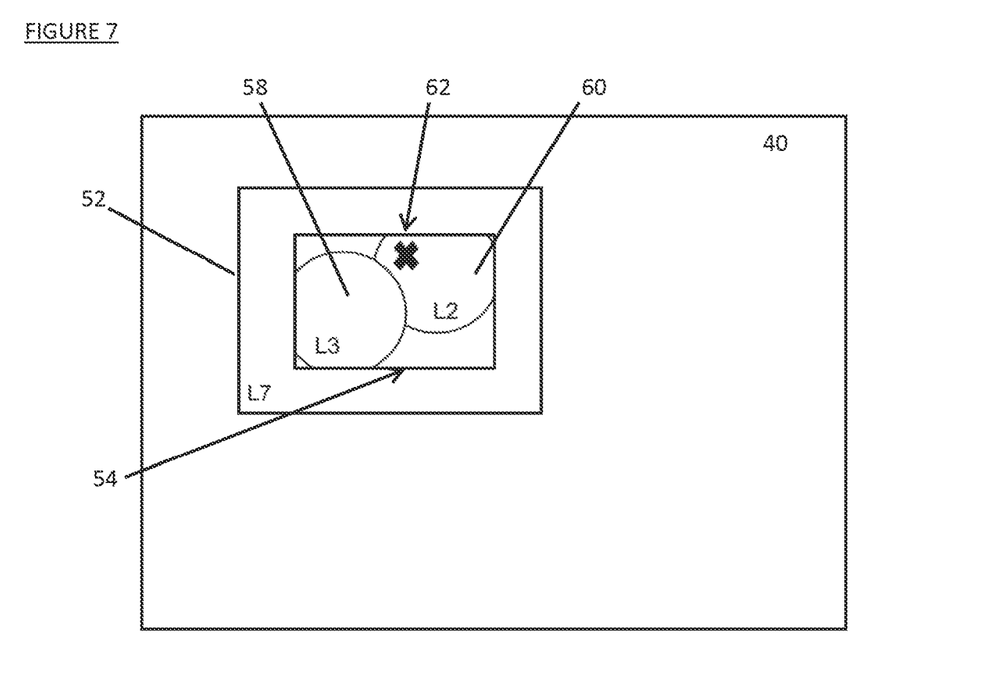
FIG. 7 is a diagram illustrating an embodiment of a displayed interface output.

By way of example, and with reference to FIGS. 6 and 7, an object 52 is illustrated in layer L7—in the foreground of the interface 40. That object provides a transparent central panel 54, through which another object 44 in layer L3 is partially visible. A user interaction with the environment to select the marked position 56 in the interface designates a pixel within the buffered interface image data that has an associated identifier which associates that pixel with object L3. Therefore, even though L3 lies behind L7, and the user has selected a position within the boundary of rectangular object 52 which lies in the foreground of the interface, the user is able to select a part of the circular object 44 which lies behind it through the transparent panel 54.

Similarly, as shown in FIG. 7, multiple objects 60, 58 in background layers—L2 and L3 in the example shown—may be visible through the transparent panel 54. In that case, either background object may be selected by the user. As shown, a user-selected position 62 identifies a circular object 60 lying in layer L2 in the illustrated example.

Figure 9:
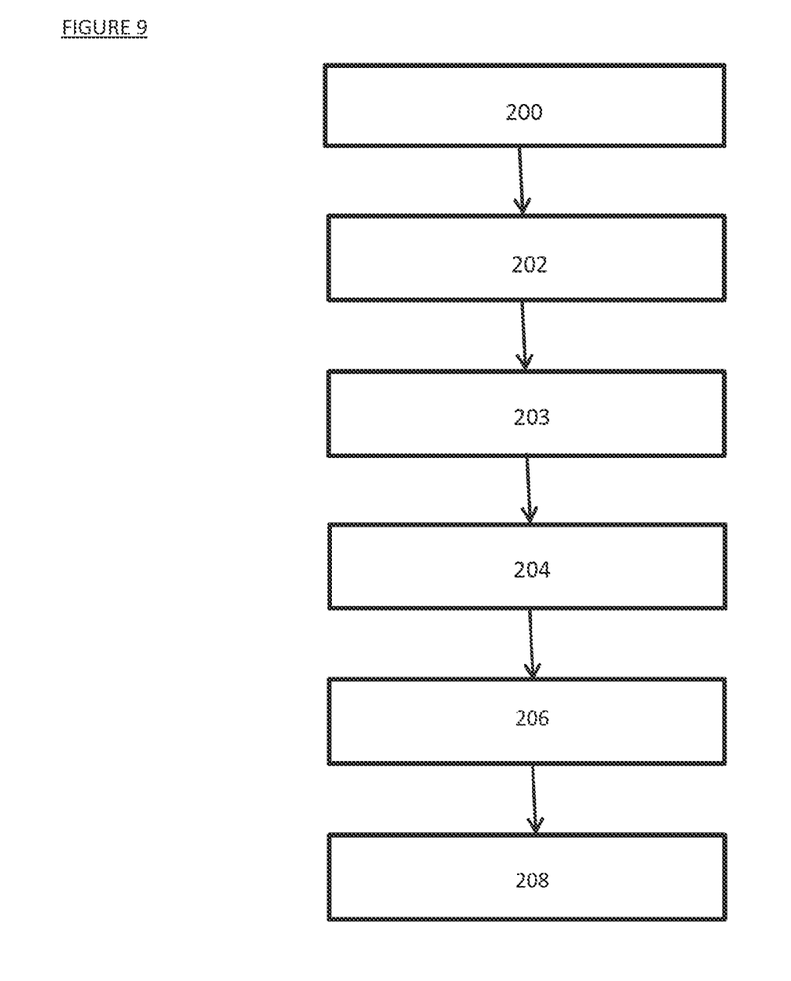
FIG. 9 is a flowchart illustrating an embodiment of a method

In broad terms, we describe a computer-implemented method of identifying an object within an interface of an object-oriented environment 40, by first generating multiple objects 44, 52, 58, 60 within the environment (step 200), each object 44, 52, 58, 60 being associated with a layer L2, L3, L7 representing the depth of the object 44, 52, 58, 60 within the environment 40.

Interface image data is stored (step 202) in the buffer in memory 22, the interface image data providing a data structure defining a quantised image space, each quantised unit, or pixel, of the interface image data having an associated object identifier corresponding to one of the objects 44, 52, 58, 60. The interface image data can be output directly to a display device, or output to store as a file or for other forms of processing, as described above.

The object and layer data is maintained in response to user inputs, in the manner previously described (step 203).

The environment receives from a user a selection of a position 56 within the interface (step 204), identifies the quantised unit (e.g. a pixel) within the rasterised image at the selected position within the interface image data stored in the buffer (step 206), and subsequently identifies the object associated with the selected position using the stored object identifier associated with the identified pixel (step 208). The user selection may be made, for example, by moving a cursor to the position within the interface display. The user may hover a mouse cursor over the position on the display, which may activate an information menu as a "pop-up menu" to be displayed in the foreground of the interface, displaying information about the object to a user. This means that in embodiments of the technology, a user my move a cursor over an object that is in a relatively deep layer of the interface, partially obscured by other objects towards the foreground of the display, and yet a user may generate the pop-up menu to appear at the front of the display—in the foreground.

In broad terms, and considering not only two dimensional but also three dimensional image spaces (or other forms of image space), when a quantised unit of the interface image data is identified by the user input, the object associated with that image data can be identified using the object identifier associated to the quantised unit. The GUI can then perform an operation in relation to that object, which could be: bringing the object to the front, remove all objects in front, zoom into the object or perform some other function applied to the identified object and/or its surroundings. Selecting an object may trigger generation of a new object such as a menu or tool-tip, for example, associated with the identified object to display data about the selected object. Identifying the object may effectively select the object as the focus of further user input via the interface, for receiving entry of further data by the user. In embodiments of the technology, identifying and selecting an object may temporarily remove one or more foreground layers from the iterative updating of the buffer while the object is selected, so that the layer associated with the selected object is in the frontmost displayed layer of the interface. For example, if the selected object is associated with the third of five layers, ordered from the foreground to the background, the first and second foreground layers may temporarily dropped from the interface image data. In this way, as the buffer is updated, data from the foreground that might otherwise obscure the selected object, is omitted.

In embodiments of the technology, while objects are assigned to layers of the interface, while maintaining the set of objects and layers (103), it is possible for an object to be moved between layers. For example, selecting an object in a relatively deep layer of the interface by making a user selection of the object—clicking on it with a mouse pointer or otherwise 'selecting' it—may result in the object being moved to a front-most layer of the interface by associating the object with a layer closer to the foreground of the interface. This reassignment of layer may be a temporary effect—once the object is no longer 'selected' by the user, it may be returned to the layer with which it was previously associated.

In some embodiments of the technology, object image data relating to a selected object, or to an animated menu or displayed item which should appear in the foreground of the interface, may be written to a separate foreground buffer (i.e. rather than reassigning the object's associated layer), so that the selected object is effectively written to a front layer of the interface image data via a separate buffer.

This selection of an object in a relatively deep layer of an interface, potentially through transparent portions of objects lying in the foreground, is made possible by storing information in the buffer, linking the pixels of quantised units in the rendered interface with the specific objects generating those portions of the displayed image. This process of storing the associated object data, tied to the image being rendered, means that the identification and selection of an object in the interface is straightforward, from any visible portion of the interface, with a low processing overhead. The selection is computed quickly and efficiently, and thus provide a highly response interface.

Selecting an object in a deeper layer may allow the user to bring that object to the foreground, either temporarily or permanently. If an object within the interface contained another object that had been truncated by the visible area of the first object then it is initially rendered in truncated form. If the user now selects the truncated object, then, that selected object can be brought to the front layer of the interface to be displayed without truncation. In other words: when an object is selected, so as to focus on the object, it can be bounded by its own dimensions and the limitations of the interface and is not necessarily bounded by any object containing it.

In embodiments of the technology, while maintaining the set of objects and layers (103), an association between an object and a layer may be altered so that the object is associated with a different layer. In this way, the object may be moved between layers of an interface display so as to bring the object forward or backward within the display of the interface. As previously described, a similar effect may be achieved by altering the priority value associated with an object in order to change its relative ordering compared to other objects associated with the same layer of the interface.

A physical foreground layer represents the front of the environment modelled within the system. When rendering an image, the process runs through the layers in turn, from the foreground to the background layer, and naturally that involves ordering the layers from the physical foreground layer to the corresponding physical background layer representing the back of the environment.

It is of course possible that the ordering of layers within the environment might be reversed—so as to reverse the order of objects displayed—showing the backmost layers rendered at the front of the displayed interface, for example. In this sense, when scanning the objects from foreground layer to background layer in line with the invention, this involves scanning from the logical foreground to the logical background, so that the objects in the environment intended to be displayed at the front of the rendered image will be scanned first.

It is also possible for a user to control the rendered view of the interface, created from the unique ordered set of layers without changing the underlying "physical" ordering of the layers. So, for example, a user may select a new logical ordering of layers so as to present the environment in a different way, differing from the default natural ordering. In this way a user can order layers in a meaningful way without risk of the established positions and ordering of objects within the environment being corrupted. For instance, the user can move the rendered view of the interface deeper into the ordered set of layers by incrementally updating the chosen logical foreground layer. In that sense, the background layer and foreground layer may be altered within the render, so as to use a different ordering of the stored layers.

A feature of the present invention is that it allows for real-time, or almost real-time, screen shots to be captured. On receipt of a user input indicative of a screen shot request, the content of the buffer may simply be output, since it stores up to date data of the objects visible within the environment. Screen capture technology of the prior art typically relies on a delay between receiving a request, and generating the screen shot, due to the requirement to calculate the visible screen data on demand. By contrast, storing a rasterised representation of the currently visible elements of the environment, the present system provides a real-time output, or an output delayed by only a single frame, as the required data is available on demand.

We also describe a computer program product, comprising instructions that when executed on a processor of a computing device as described, cause the computing device to carry out the steps of the methods described herein.

It should be understood that while the methods described herein are generally associated with producing interface image data for output by a device, the output may be to a display device, or may be to another form of device or to another system entirely. It is envisaged that the steps of the computer-implemented methods herein may be performed by software running within an OS, where the technology takes over the output role of the OS for the application it is associated with. Alternatively, the software may be embedded, such that no other software (such as an OS) controls the output. The output interface image data may be communicated to a display device, or may be rendered to a video file, or to a virtual machine, or may be processed for communication over a network, for example. Conceptually, the computer implemented methods described herein may operate on hardware associated with or formed integrally with a display device (e.g. receiving object telemetry data from an external source).

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

When used in this specification and claims, the terms "comprises" and "comprising" and variations thereof mean that the specified features, steps or integers are included. The terms are not to be interpreted to exclude the presence of other features, steps or components.

Although certain example embodiments of the invention have been described, the scope of the appended claims is not intended to be limited solely to these embodiments. The claims are to be construed literally, purposively, and/or to encompass equivalents.

The invention claimed is:

1. A computer-implemented method of rendering an interface of an object-oriented environment, including the steps of:

allocating a buffer in memory for storing interface image data, the buffer providing a data structure defining a quantised image space for visible object image data;

generating a set of multiple objects within the environment, each object being associated with a layer representing the depth of the object within the environment, the layer being one of an ordered set of layers ranging from a foreground layer to a background layer;

maintaining the set of objects, in response to receiving a user input, by performing at least one of: adding or removing an object, adding or removing a layer and any object associated with the layer, changing the layer associated with an object, or changing the order of the layers;

iteratively updating the buffer to create image data, by incrementally selecting each one of the multiple layers in turn, as the current layer, from the set of layers, starting with the foreground layer and ending with the background layer, and, for each object associated with the current layer:

determining object image data representing the space the object occupies within the interface, comparing the object image data to the interface image data stored in the buffer, determining visible object image data from the object image data, in which portions of the object image data that are obscured by one or more objects in a previous layer are excluded from the visible object image data, and updating the interface image data stored in the buffer by rendering the visible object image data; and outputting the buffer containing interface image data.

2. The computer-implemented method of claim 1, wherein the quantised image space defined in the interface image data represents a 2D image, a stereoscopic 3D image, or image data for rendering a 3D environment or an augmented reality environment, and wherein outputting the interface image data includes outputting the interface image data to a display device.

3. The computer-implemented method of claim 1, wherein outputting the interface image data includes outputting the interface image data to a compositing window manager to be rendered within an interface of an operating system.

4. The computer-implemented method of claim 1, wherein outputting the interface image data includes writing the image data to a memory or storage device, or streaming the data over a connection to a remote device.

5. The computer-implemented method of claim 1, wherein updating the interface image data stored in the buffer further includes storing, for each quantised unit of the interface image data, an associated object identifier corresponding to the object.

6. The computer-implemented method of claim 5, wherein comparing the object image data to the interface image data stored in the buffer includes:

determining one or more overlapping quantised units;

identifying, for the or each overlapping quantised unit, the object associated with the quantised unit stored in the interface image data using the stored object identifier; and if the layer of the identified object is nearer to the foreground than the layer of the current object, excluding the or each quantised unit from the visible object image data.

7. A computer-implemented method of identifying an object within an interface of an object-oriented environment rendered by the method of claim 5, including:

receiving a user selection of a position within the interface, and identifying the object displayed at the selected position within the interface.

8. The computer-implemented method of claim 7, wherein identifying the object displayed at the selected position within the interface includes:

identifying the quantised unit within the quantised image space at the selected position within the interface image data stored in the buffer, and identifying the object associated with the selected position using the stored object identifier associated with that quantised unit in the data stored in the buffer.

9. The computer-implemented method of claim 7, further including performing an action on the identified object, wherein the action is one of:

changing the layer associated with the identified object, either permanently or temporarily;

generating a new object associated with the identified object for displaying data about the selected object;

selecting the object as the focus for further user input;

temporarily removing one or more foreground layers from the iterative updating of the buffer while the object is selected, so that the layer associated with the selected object is in the frontmost displayed layer of the interface.

10. The computer-implemented method of claim 1, in which updating the buffer for each object associated with the current layer involves processing each object in an order determined by priority values associated with the respective objects.

11. The computer-implemented method of claim 1, wherein, in response to receipt of a user input indicating a request for a screenshot, outputting the buffer containing interface image data substantially in real-time.

12. A computing device including a memory and a processor, the computing device being configured to render an interface of an object-oriented environment, wherein:

the memory provides a buffer for storing interface image data defining a quantised image space for visible object image data;

the processor being configured to:

generate a set of objects within the environment, each object being associated with a layer representing the depth of the object within the environment, the layer being one of an ordered set of layers ranging from a foreground layer to a background layer;

maintain the set of objects, in response to receiving a user input, by performing at least one of: adding or removing an object, adding or removing a layer and any object associated with the layer, changing the layer associated with an object, or changing the order of the layers;

iteratively update the buffer to create image data, by incrementally selecting each one of the multiple layers in turn, as the current layer, from the set of layers, starting with the foreground layer and ending with the background layer, and, for each object associated with the current layer:

to determine object image data representing the space the object occupies within the interface, to compare the object image data to the interface image data stored in the buffer, to determine visible object image data from the object image data, in which portions of the object image data that are obscured by one or more objects in a previous layer are excluded from the visible object image data, and to update the interface image data stored in the buffer by rendering the visible object image data; and output the buffer containing interface image data.

13. The device of claim 12, wherein the quantised image space defining the interface image data is compatible with the resolution of an associated display device, and the device outputs the interface image data to the display device.

14. The device of claim 12, wherein the interface image data is output to a compositing window manager of an operating system running on the device to be rendered on a display device within an interface of the operating system.

15. The device of claim 12, wherein the memory further stores for each quantised unit of the interface image data, an associated object identifier corresponding to the object.

16. The device of claim 15, wherein comparing the object image data to the interface image data stored in the buffer includes:

determining one or more overlapping quantised units;

identifying, for the or each overlapping quantised unit, the object associated with the quantised unit stored in the interface image data using the stored object identifier; and if the layer of the identified object is nearer to the foreground than the layer of the current object, excluding the or each quantised unit from the visible object image data.

17. The device of claim 15, further configured to:

receive a user input corresponding to a selection of a position within the interface, and identify the object displayed at the selected position within the interface.

18. The device of claim 17, wherein the processor is further configured to:

identify the quantised unit within the quantised image space at the selected position within the interface image data stored in the buffer, and identify the object associated with the selected position using the stored object identifier associated with that quantised unit in the data stored in the buffer.

19. The device of claim 17, wherein the processor is further configured to perform an action on the identified object, wherein the action is one of:

changing the layer associated with the identified object, either permanently or temporarily;

generating a new object associated with the identified object for displaying data about the selected object;

selecting the object as the focus for further user input;

temporarily removing one or more foreground layers from the iterative updating of the buffer while the object is selected, so that the layer associated with the selected object is in the frontmost displayed layer of the interface.

20. The device of claim 12, wherein updating the buffer for each object associated with the current layer involves processing each object in an order determined by priority values associated with the respective objects.

21. A computer-implemented method of identifying an object within an interface of an object-oriented environment, including the steps of:

generating a set of multiple objects within the environment, each object being associated with a layer representing the depth of the object within the environment;

maintaining the set of objects, in response to receiving a user input, by performing at least one of: adding or removing an object, adding or removing a layer and any object associated with the layer, changing the layer associated with an object, or changing the order of the layers;

storing interface image data in a buffer in memory, the interface image data providing a data structure defining a quantised image space, each quantised unit of the interface image data having an associated object identifier corresponding to one of the objects;

receiving a user selection of a position within the interface, identifying the quantised unit within the quantised image space at the selected position within the interface image data stored in the buffer, and identifying the object associated with the selected position using the stored object identifier associated with the identified quantised unit.

* * * * *